US010817547B2

(12) United States Patent
Yerrabommanahalli et al.

(10) Patent No.: US 10,817,547 B2
(45) Date of Patent: Oct. 27, 2020

(54) CELLULAR NETWORK INFORMATION

(71) Applicant: Apple Inc., Cupertino, CA (US)

(72) Inventors: Vikram B. Yerrabommanahalli, Sunnyvale, CA (US); Rohan C. Malthankar, San Jose, CA (US); Yogesh D. Karandikar, Sunnyvale, CA (US); Farouk Belghoul, Campbell, CA (US); Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/297,258

(22) Filed: Mar. 8, 2019

(65) Prior Publication Data

US 2019/0205319 A1 Jul. 4, 2019

Related U.S. Application Data

(63) Continuation of application No. 15/082,634, filed on Mar. 28, 2016, now Pat. No. 10,229,135.

(Continued)

(51) Int. Cl.
*G06F 16/29* (2019.01)
*H04L 29/06* (2006.01)
(Continued)

(52) U.S. Cl.
CPC ........ *G06F 16/29* (2019.01); *G06F 16/90335* (2019.01); *H04L 65/1006* (2013.01);
(Continued)

(58) Field of Classification Search
CPC ......... G06F 17/30241; G06F 17/30979; H04L 65/1006; H04L 65/1016
See application file for complete search history.

(56) References Cited

U.S. PATENT DOCUMENTS 8,068,870 B2 * 11/2011 Kumar .................. H04W 48/16
455/550.1
10,057,840 B2 * 8/2018 Lee ...................... H04W 72/085
(Continued)

OTHER PUBLICATIONS

Support for Distinguished Location Information on WLAN, SA WG2 Meeting #S2-109, S2-151471, May 25-29, 2014, Fukuoka, Japan, 2 pages.

*Primary Examiner* — Md K Talukder
(74) *Attorney, Agent, or Firm* — Kowert, Hood, Munyon, Rankin & Goetzel, P.C.

(57) ABSTRACT

Techniques are disclosed relating to a mobile device that communicates over short-range networks and long-range networks. In various embodiments, a mobile device includes one or more radios configured to communicate using a plurality of radio access technologies (RATs) including a cellular RAT and a short-range RAT. The mobile device may establish a first connection and a second connection with a network such that the first connection uses the short-range RAT and the second connection uses the cellular RAT. The mobile may collect information about the second connection and communicate the collected information to the network over the first connection. In some embodiments, the information includes a base station identifier, an MCC, an MNC, the cellular RAT and a cellular information age indicating the time since the information about the second connection was collected by the UE.

13 Claims, 10 Drawing Sheets

Related U.S. Application Data

(60) Provisional application No. 62/236,566, filed on Oct. 2, 2015, provisional application No. 62/183,026, filed on Jun. 22, 2015.

(51) Int. Cl.
*G06F 16/903* (2019.01)
*H04W 76/16* (2018.01)
*H04W 76/12* (2018.01)
*H04W 76/50* (2018.01)

(52) U.S. Cl.
CPC ...... *H04L 65/1016* (2013.01); *H04L 65/1073* (2013.01); *H04W 76/12* (2018.02); *H04W 76/16* (2018.02); *H04W 76/50* (2018.02)

(56) References Cited

U.S. PATENT DOCUMENTS

| | | | | |
|---|---|---|---|---|
| 2005/0059400 A1* | 3/2005 | Jagadeesan | ............ | H04W 36/30 455/436 |
| 2005/0232209 A1* | 10/2005 | Buckley | ................ | H04W 48/14 370/338 |
| 2011/0026440 A1* | 2/2011 | Dunn | .................. | H04W 4/029 370/259 |
| 2011/0194530 A1* | 8/2011 | Tinnakornsrisuphap | ................... | H04W 36/04 370/331 |
| 2012/0244844 A1* | 9/2012 | Patel | .................... | H04L 67/148 455/414.1 |
| 2013/0024574 A1* | 1/2013 | Lau | .................... | H04L 65/1073 709/227 |
| 2013/0029687 A1* | 1/2013 | Cooper | .................. | H04W 4/12 455/456.1 |
| 2013/0065606 A1* | 3/2013 | Kurokawa | .......... | H04L 65/1006 455/456.1 |
| 2013/0308632 A1* | 11/2013 | Keller | ................ | H04L 65/1069 370/352 |
| 2013/0331053 A1* | 12/2013 | Vick | ...................... | H04W 4/90 455/404.1 |
| 2014/0228000 A1* | 8/2014 | Nagatoshi | ............. | H04W 12/08 455/411 |
| 2014/0335887 A1* | 11/2014 | Liu | ......................... | G01S 19/48 455/456.1 |
| 2015/0163704 A1* | 6/2015 | Catovic | ............. | H04W 36/0022 370/331 |
| 2015/0163822 A1* | 6/2015 | Guo | .................... | H04W 72/121 370/329 |
| 2015/0215835 A1* | 7/2015 | Sirotkin | ................ | H04W 36/16 455/436 |
| 2015/0296496 A1 | 10/2015 | Cho et al. | | |
| 2015/0327117 A1* | 11/2015 | Sirotkin | ............ | H04W 36/0066 370/235 |
| 2015/0350961 A1* | 12/2015 | Cho | ........................ | H04W 8/08 455/436 |
| 2015/0382281 A1* | 12/2015 | Sirotkin | ................ | H04L 65/1006 455/552.1 |
| 2016/0142954 A1* | 5/2016 | Cho | .................. | H04W 36/0066 370/331 |
| 2016/0174191 A1* | 6/2016 | Singh | .................. | H04W 60/005 370/329 |
| 2016/0219475 A1* | 7/2016 | Kim | ................ | H04W 76/27 |
| 2016/0234749 A1* | 8/2016 | Singh | .................... | H04W 48/02 |
| 2016/0353360 A1* | 12/2016 | Lee | .................... | H04W 72/085 |
| 2016/0374132 A1* | 12/2016 | Yerrabommanahalli | .................... | G06F 16/90335 |
| 2019/0205319 A1* | 7/2019 | Yerrabommanahalli | .................... | H04L 65/1006 |

\* cited by examiner

P-Access-Network-Info Header Field 822A

```
P-Access-Network-Info  = "P-Access-Network-Info" HCOLON
                         access-net-spec *(COMMA access-net-spec)

access-net-spec        = (access-type / access-class)
                         *(SEMI access-info)

access-type            = "IEEE-802.11" / "IEEE-802.11a" /
                         "IEEE-802.11b" / "IEEE-802.11g" /
                         "IEEE-802.11n" /
                         "IEEE-802.3" / "IEEE-802.3a" /
                         "IEEE-802.3ab" / "IEEE-802.3ae" /
                         "IEEE-802.3ak" / "IEEE-802.3ah" /
                         "IEEE-802.3aq" / "IEEE-802.3an" /
                         "IEEE-802.3e" / "IEEE-802.3i" /
                         "IEEE-802.3j" / "IEEE-802.3u" /
                         "IEEE-802.3y" / "IEEE-802.3z" /
                         "3GPP-GERAN" /
                         "3GPP-UTRAN-FDD" / "3GPP-UTRAN-TDD" /
                         "3GPP-E-UTRAN-FDD" / "3GPP-E-UTRAN-TDD" /
                         "3GPP2-1X-Femto" / "3GPP2-UMB" /
                         "3GPP2-1X-HRPD" / "3GPP2-1X" /
                         "ADSL" / "ADSL2" / "ADSL2+" / "RADSL" /
                         "SDSL" / "HDSL" / "HDSL2" / "G.SHDSL" /
                         "VDSL" / "IDSL" /
                         "DOCSIS" / "GSTN" / "GPON" / " XGPON1" /
                         "DVB-RCS2" / token access-class           = "3GPP-GERAN" /  "3GPP-UTRAN" /
                         "3GPP-E-UTRAN" / "3GPP-WLAN" /
                         "3GPP-GAN" / "3GPP-HSPA" /
                         "3GPP2" / token access-info            = cgi-3gpp / utran-cell-id-3gpp /
                         dsl-location / i-wlan-node-id /
                         ci-3gpp2 / eth-location /
                         ci-3gpp2-femto / fiber-location /
                         np / gstn-location /local-time-zone /
                         dvb-rcs2-node-id / extension-access-info np                     = "network-provided"

extension-access-info  = gen-value cgi-3gpp               = "cgi-3gpp" EQUAL
                              (token / quoted-string)

utran-cell-id-3gpp     = "utran-cell-id-3gpp" EQUAL
                              (token / quoted-string)

i-wlan-node-id         = "i-wlan-node-id" EQUAL
                              (token / quoted-string)
. . .
```

*FIG. 9A*

```
Cellular-Network-Info Header Field 822B
    Cellular-Network-Info   = "Cellular-Network-Info" HCOLON
                                cellular-net-spec cellular-net-spec       = access-type * (SEMI cellular-access-info)

access-type             = "3GPP-GERAN" /
                              "3GPP-UTRAN-FDD" / "3GPP-UTRAN-TDD" /
                              "3GPP-E-UTRAN-FDD" / "3GPP-E-UTRAN-TDD" /
                              "3GPP2-1X-Femto" / "3GPP2-UMB" /
                              "3GPP2-1X-HRPD" / "3GPP2-1X" / token cellular-access-info    = access-info / cell-info-age access-info             = cgi-3gpp / utran-cell-id-3gpp /
                              ci-3gpp2 / ci-3gpp2-femto /
                              extension-access-info extension-access-info   = gen-value cgi-3gpp                = "cgi-3gpp" EQUAL (token / quoted-string)

utran-cell-id-3gpp      = "utran-cell-id-3gpp" EQUAL (token /
                                quoted-string)

ci-3gpp2                = "ci-3gpp2" EQUAL (token / quoted-string)

ci-3gpp2-femto          = "ci-3gpp2-femto" EQUAL (token /
                                quoted-string)

cell-info-age           = "cell-info-age" EQUAL 1*9DIGIT
```

FIG. 9B

CELLULAR NETWORK INFORMATION

PRIORITY DATA

The present application is a continuation of U.S. application Ser. No. 15/082,634 filed Mar. 28, 2016 (now U.S. Pat. No. 10,229,135), which claims priority to U.S. Provisional Appl. No. 62/236,566, filed Oct. 2, 2015, and U.S. Provisional Appl. No. 62/183,026, filed Jun. 22, 2015; the disclosures of each of the above-referenced applications are incorporated by reference herein in their entireties.

FIELD

The present application relates to wireless communication, and more particularly, to techniques relating to handovers between different radio access technologies.

DESCRIPTION OF THE RELATED ART

Wireless communication systems are rapidly growing in usage. Further, wireless communication technology has evolved from voice-only communications to also include the transmission of data, such as Internet and multimedia content.

Expanding traffic on mobile networks has increased the need for mobile data offloading, wherein a mobile device may access carrier-provided services originally targeted for cellular networks over an alternative wireless network, such as WiFi, one type of wireless local area network (WLAN). One form of mobile data offloading uses the I-WLAN (Interworking Wireless LAN) or SMOG (S2b Mobility based on GTP) architecture to supply carrier-provided services to the mobile device over WiFi. These carrier-provided services may include VVM (Visual VoiceMail), MMS (Multimedia Messaging Service), SMS (Short Messaging Service) and IMS (IP Multimedia Subsystem).

Thus, a user equipment device (UE), which may also be referred to as a mobile device, may communicate using different radio access technologies (e.g., different cellular RATs and/or WLANs) at different times. In various situations, the UE and/or the network may initiate handover between different wireless technologies based on various criteria. For example, consider a situation in which a UE is being used for a voice over LTE (VoLTE) phone call outside a residence and the user steps inside. At this point, the signal strength of the LTE connection may drop (e.g., because of the roof of the residence) and the signal strength of a WiFi connection may increase (e.g., because the user is closer to a WiFi access point). In response, the UE may initiate a handover from VoLTE to WiFi while the network may initiate a handover from VoLTE to another cellular RAT (e.g., a circuit-switched cellular RAT). If the signal strength of the WiFi connection, however, becomes weak, this may result in the UE attempting to frequently hop between the LTE and WiFi connections causing a deterioration in call quality.

SUMMARY

Embodiments are presented related to a user equipment device (UE) that is able to perform handovers between long-range wireless networks (e.g., cellular networks) and short-range wireless networks (e.g., WiFi and Bluetooth networks).

In some embodiments, a UE may establish a first connection with a network using a short-range RAT and a second connection with the network using a cellular RAT. The UE may collect information about the second connection using the cellular RAT and communicate the collected information to the network over the first connection using the short-range RAT. In some embodiments, the information may include one or more of an identity of the cell the user is being served by including a base station identifier, a mobile country code (MCC), a mobile network code (MNC), an indication of the cellular RAT (e.g., 3GPP-E-UTRAN-FDD, 3GPP-UTRAN-TDD, 3GPP2-1X, etc.) and a cellular information age indicating the time since the information about the cell identity was collected by the UE. In some embodiments, the network may use this information to provide better services to the UE.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIGS. 9A and 9B illustrate some embodiments of header fields that include link information.

Figure 1:
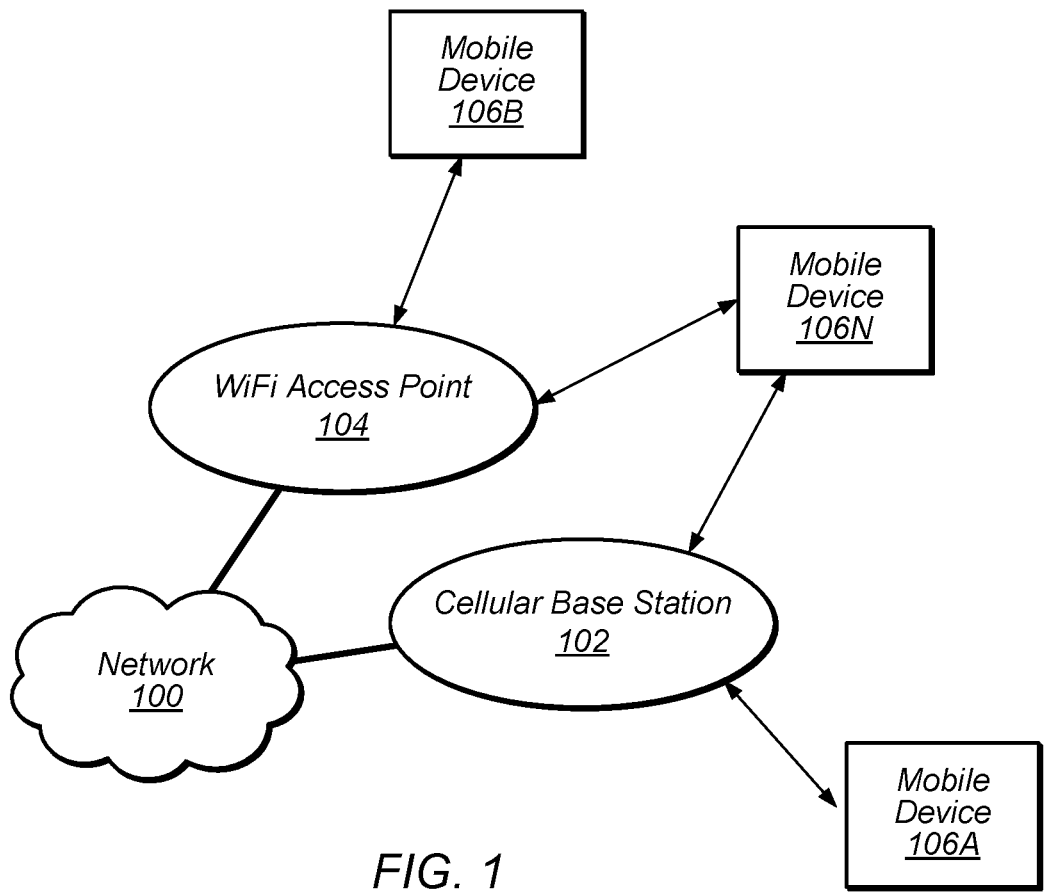
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

The present disclosure describes embodiments in which a mobile device may collect information about a cellular link and communicate that information over a short-range wireless link to a network provider. The disclosure begins with a discussion of an exemplary communication system including various components with respect to FIGS. 1-7. Components of a mobile device that may be used to collect and communicate cellular-link information are then descried with respect to FIG. 8. Examples of packet header fields for communicating information are described in conjunction with FIGS. 9A and 9B. Embodiments of methods are lastly discussed with respect to FIGS. 10A-10C.

Acronyms

The following acronyms are used in the present disclosure.
BS: Base Station
AP: Access Point
APN: Access Point Name
LTE: Long Term Evolution
VoLTE: Voice over LTE
VOIP: Voice Over IP
IMS: IP Multimedia Subsystem
MO: Mobile Originated
MT: Mobile Terminated
RAT: Radio Access Technology
TX: Transmit
RX: Receive
WLAN: Wireless Local Area Network
I-WLAN: Interworking WLAN
SIP: Session Initiation Protocol
PDN: Packet Data Network
PGW: PDN Gateway
SGW: Serving Gateway
P-CSCF: Proxy Call Session Control Function
ePDG: evolved Packet Data Gateway
IFOM: IP Flow Mobility
SMOG: S2b Mobility based on GTP
GTP: GPRS Tunneling Protocol
GPRS: General Packet Radio Service

Glossary

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system, which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Mobile Device—any of various types of communication devices, which are mobile and are capable of communicating on a cellular network and a non-cellular network, such as WiFi. A UE is an example of a mobile device.

Base Station—The term "Base Station" has the full breadth of its ordinary meaning, and at least includes a wireless communication station installed at a fixed location and used to communicate as part of a wireless cellular telephone system or cellular radio system.

Access Point—This term has the full breadth of its ordinary meaning, and at least includes a wireless communication device which offers connectivity to a wireless local area network (WLAN), such as a WiFi network.

WiFi—This term has the full breadth of its ordinary meaning, and at least includes a wireless local area network technology based on the IEEE (Institute of Electrical and Electronics Engineers) 802.11 standards, and future revisions or enhancements to those standards.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel/Link—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
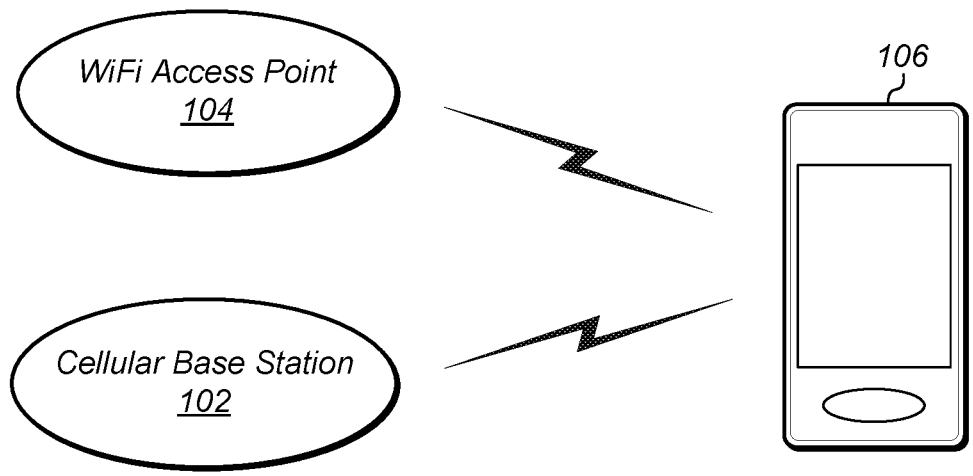
FIG. 2 illustrates a mobile device in communication with a cellular base station and an access point (AP), according to some embodiments.

FIGS. 1 and 2—Communication System

Turning now to FIG. 1, an exemplary (and simplified) wireless communication system is illustrated, according to some embodiments. It is noted that the system of FIG. 1 is merely one example of a possible system, and disclosed embodiments may be implemented in any of various systems, as desired.

As shown, the example wireless communication system includes a cellular base station 102 which may communicate over a transmission medium with one or more mobile devices 106A, 106B, etc., through 106N. Each of the mobile devices may be, for example, a "user equipment device" (UE) or other types of devices as defined above.

The base station 102 may be a base transceiver station (BTS) or cell site, and may include hardware that enables wireless cellular communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the UEs 106 may be configured to communicate over the transmission medium using any of various cellular radio access technologies (RATs), also referred to as wireless cellular communication technologies, or telecommunication standards, such as GSM, UMTS (WCDMA, TD-SCDMA), LTE, LTE-Advanced (LTE-A), 3GPP2 CDMA2000 (e.g., 1xRTT, 1xEV-DO, HRPD, eHRPD), WiFi, WiMAX etc. A typical wireless cellular communication system will include a plurality of cellular base stations, which provide different coverage areas or cells, with handoffs between cells.

Additionally, the example wireless communication system may include one or more wireless access points (such as access point 104) which may be communicatively coupled to the network 100. Each wireless access point 104 may provide a wireless local area network (WLAN) for communication with mobile devices 106. These wireless access points may comprise WiFi access points. Wireless access point 104 may be configured to support cellular network offloading and/or otherwise provide wireless communication services as part of the wireless communication system illustrated in FIG. 1.

Cellular base station 102 and other similar base stations, as well as access points (such as access point 104) operating according to a different wireless communication standard (e.g., WiFi), may thus be provided as a network which may provide continuous or nearly continuous overlapping service to mobile devices 106 and similar devices over a wide geographic area via one or more wireless communication standards.

Thus, while base station 102 may act as a "serving cell" for a UE 106 as illustrated in FIG. 1, each mobile device 106 may also be capable of receiving signals from (and possibly within communication range of) one or more other cells (which might be provided by other base stations (not shown) and/or wireless local area network (WLAN) access points, which may be referred to as "neighboring cells" or "neighboring WLANs" (e.g., as appropriate), and/or more generally as "neighbors".

Turning now to FIG. 2, a mobile device 106 (e.g., one of the devices 106A through 106N) in communication with both a WiFi access point 104 and a cellular base station 102 is illustrated, according to some embodiments. The mobile device 106 may be a device with both cellular communication capability and non-cellular communication capability, e.g., WiFi capability, such as a mobile phone, a hand-held device, a computer or a tablet, a wearable device, or virtually any type of wireless device.

The mobile device 106 may include a processor that is configured to execute program instructions stored in memory. The mobile device 106 may perform any of the method embodiments described herein by executing such stored instructions. Alternatively, or in addition, the mobile device 106 may include a programmable hardware element such as an FPGA (field-programmable gate array) that is configured to perform any of the method embodiments described herein, or any portion of any of the method embodiments described herein.

In some embodiments, the mobile device 106 may be configured to communicate using any of multiple radio access technologies/wireless communication protocols. For example, the mobile device 106 may be configured to communicate using any of various cellular communication technologies, such as GSM, UMTS, CDMA2000, LTE, LTE-A, etc. The mobile device may also be configured to communicate using any of various non-cellular communication technologies such as WLAN/WiFi, or GNSS. Other combinations of wireless communication technologies are also possible.

The mobile device 106 may include one or more antennas for communicating using one or more wireless communication protocols or technologies. In one embodiment, the mobile device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the mobile device 106 may share one or more parts of receive and/or transmit chains between multiple wireless communication technologies, such as those discussed above.

In some embodiments, the mobile device 106 may include separate transmit and/or receive chains (e.g., including separate RF and/or digital radio components) for each wireless communication protocol with which it is configured to communicate. As a further possibility, the mobile device 106 may include one or more radios, which are shared between multiple wireless communication protocols, and one or more radios, which are used exclusively by a single wireless communication protocol. For example, the mobile device 106 might include a shared radio for communicating using either of LTE or 1×RTT (or LTE or GSM), and separate radios for communicating using each of WiFi and Bluetooth. Other configurations are also possible.

Figure 3:
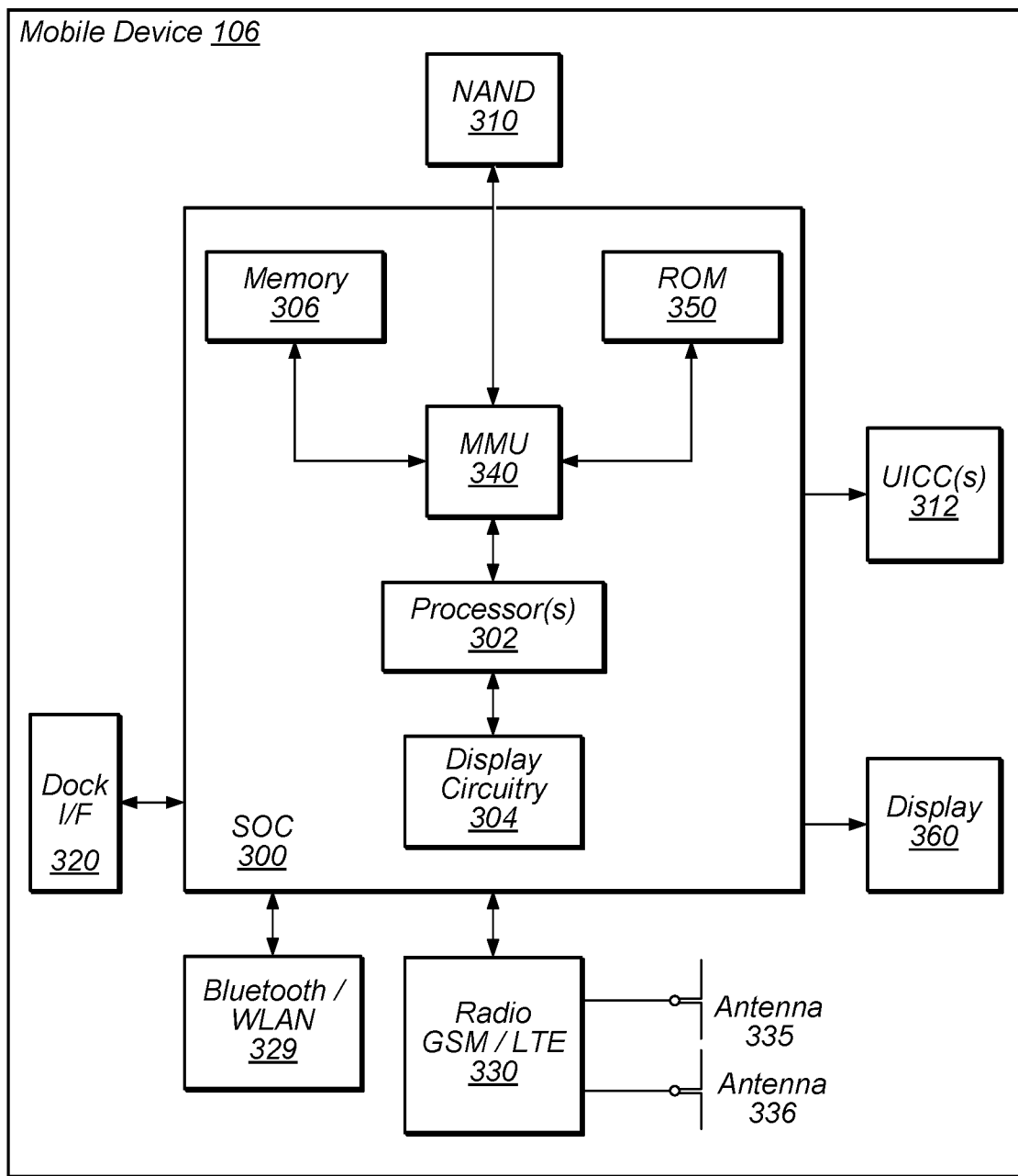
FIG. 3 illustrates an example block diagram of a mobile device, according to some embodiments.

FIG. 3—Mobile Device Block Diagram

Turning now to FIG. 3, an exemplary simplified block diagram of a mobile device 106 is illustrated, according to some embodiments. As shown, the mobile device 106 may include a system on chip (SOC) 300, which may include portions for various purposes. The SOC 300 may be coupled to various other circuits of the mobile device 106. For example, the mobile device 106 may include various types of memory (e.g., including NAND flash 310), a connector interface 320 (e.g., for coupling to a computer system, dock, charging station, etc.), the display 360, cellular communication circuitry 330 such as for LTE, GSM, etc., and short-range wireless communication circuitry 329 (e.g., Bluetooth™ and WLAN circuitry). The mobile device 106 may further comprise one or more smart cards 312 that comprise SIM (Subscriber Identity Module) functionality, such as one or more UICC(s) (Universal Integrated Circuit Card(s)) cards 312. The cellular communication circuitry 330 may couple to one or more antennas, preferably two antennas 335 and 336 as shown. The short-range wireless communication circuitry 329 may also couple to one or both of the antennas 335 and 336 (this connectivity is not shown for ease of illustration).

As shown, the SOC 300 may include processor(s) 302, which may execute program instructions for the mobile device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector I/F 320, and/or display 360. The MMU 340 may be configured to perform memory protection and page table translation or set up. In some embodiments, the MMU 340 may be included as a portion of the processor(s) 302.

In some embodiments, as noted above, the mobile device 106 includes at least one smart card 312, such as a UICC 312, which executes one or more Subscriber Identity Module (SIM) applications and/or otherwise implement SIM functionality. The at least one smart card 312 may be only a single smart card 312, or the mobile device 106 may comprise two or more smart cards 312. Each smart card 312 may be embedded, e.g., may be soldered onto a circuit board in the mobile device 106, or each smart card 312 may be implemented as a removable smart card, an electronic SIM (eSIM) or any combination thereof. Any of various other SIM configurations are also contemplated.

As noted above, the mobile device 106 may be configured to communicate wirelessly using multiple radio access technologies (RATs). The mobile device 106 may be configured to communicate according to a WiFi RAT and/or one or more cellular RATs, e.g., such as communicating on both WiFi and cellular at the same time. For example, the mobile device 106 may be communicating on a primary communication channel (such as WiFi), and in response to detected degradation of the primary communication channel may establish a secondary communication channel (such as on cellular). The mobile device 106 may operate to dynamically establish and/or remove different primary and/or secondary communication channels as needed, e.g., to provide the best user experience while attempting to minimize cost.

As described herein, the mobile device 106 may include hardware and software components for implementing the features and methods described herein. The processor 302 of the mobile device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the mobile device 106, in conjunction with one or more of the other components 300, 304, 306, 310, 320, 330, 335, 340, 350, 360 may be configured to implement part or all of the features described herein.

Figure 4:
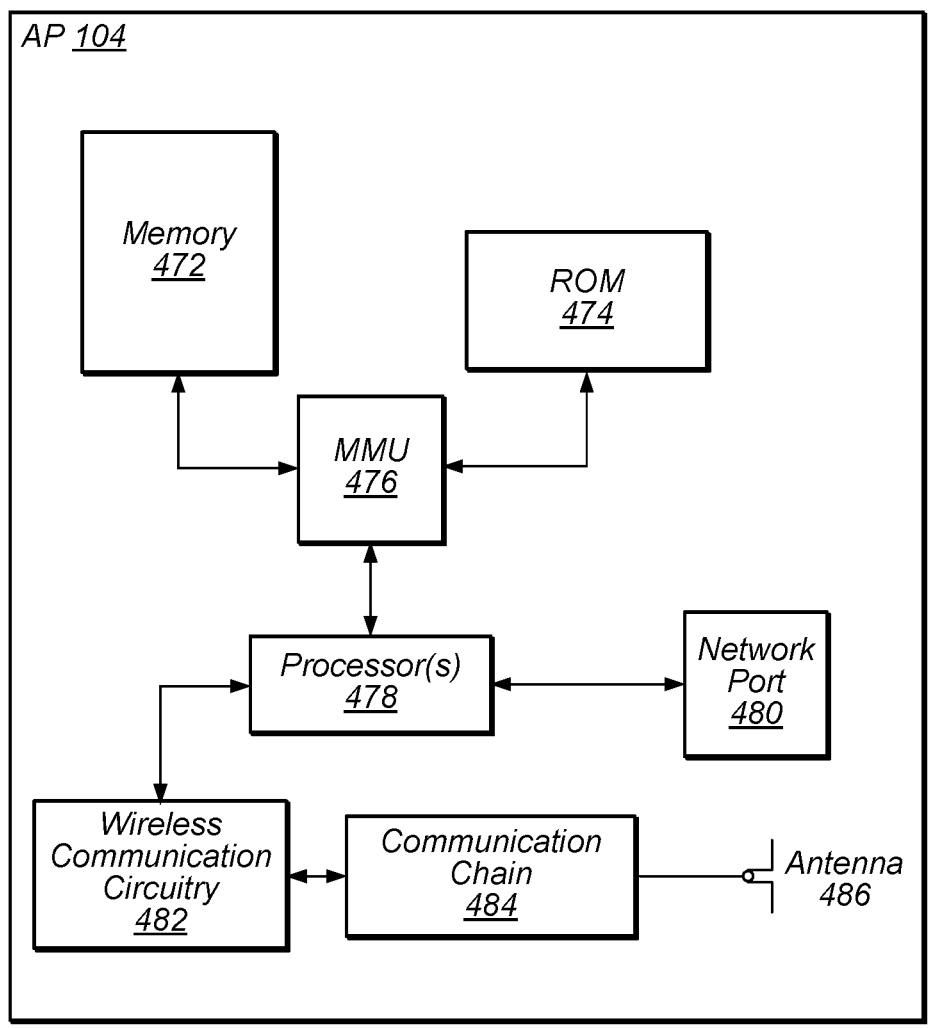
FIG. 4 illustrates an example block diagram of an access point, according to some embodiments.

FIG. 4—Access Point Block Diagram

Turning now to FIG. 4, an exemplary block diagram of an access point 104 is illustrated, according to some embodiments. It is noted that the access point 104 of FIG. 4 is merely one example of a possible access point. As shown, the access point 104 may include processor(s) 478, which may execute program instructions for the base station 102. The processor(s) 478 may also be coupled to memory management unit (MMU) 476, which may be configured to receive addresses from the processor(s) 478 and translate those addresses to locations in memory (e.g., memory 472 and read only memory (ROM) 474) or to other circuits or devices.

The access point 104 may include at least one network port 480. The network port 480 may be configured to couple to a network, such as the Internet, and provide a plurality of devices, such as mobile devices 106, access to the network as described above in FIGS. 1 and 2.

The network port 480 (or an additional network port) may also be configured to couple to a cellular network, e.g., a core network of a cellular service provider. The core network may provide mobility related services and/or other services to a plurality of devices, such as mobile devices 106. In some cases, the network port 480 may couple to a telephone network via the core network, and/or the core network may provide a telephone network (e.g., among other mobile devices serviced by the cellular service provider).

The access point 104 may include at least one antenna 486, and possibly multiple antennas. The at least one antenna 486 may be configured to operate as a wireless transceiver and may be further configured to communicate with mobile devices 106 via wireless communication circuitry 482. The antenna 486 communicates with the wireless communication circuitry 482 via communication chain 484. Communication chain 484 may be a receive chain, a transmit chain or both. The wireless communication circuitry 482 and the communication chain 484 may compose a radio. The radio may be configured to communicate via various wireless local area network standards, including, but not limited to WiFi.

Cellular base station 102 may also be described according to the block diagram of FIG. 4, except that communication may be performed using any of various cellular communication technologies.

Figure 5:
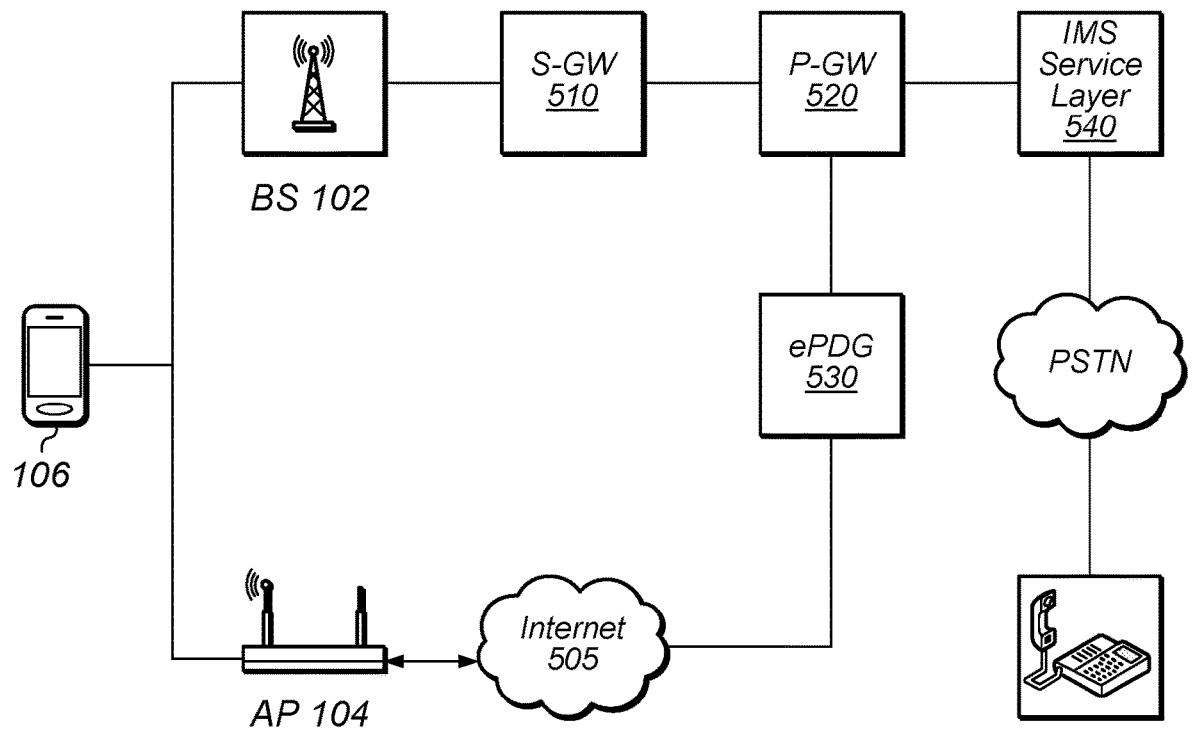
FIG. 5 is a block diagram of an example communication system, according to some embodiments.

FIG. 5—Example Wireless Communication System

Turning now to FIG. 5, according to some embodiments, an exemplary wireless communication system is illustrated. As shown, the mobile device 106 may communicate with a cellular network via cellular base station (BS) 102. The cellular base station 102 may communicate with a Serving Gateway (SGW) 510. In some embodiments, the SGW 510 is responsible for handovers with neighboring base stations. In the illustrated embodiment, SGW 510 couples to a Packet Data Network (PDN) Gateway, or (PGW) 520. As shown, evolved Packet Data Gateway (ePDG) 530 operates to interface between the cellular and WiFi networks. PGW 520 assigns device IP addresses of the iWLAN tunnel interface and the cellular interface. Together ePDG 530, SGW 510 and PGW 520 make up the evolved packet core (EPC).

As shown, mobile device 106 may also communicate with a WiFi access point (AP) 104, where the WiFi access point presents a WiFi network. The WiFi access point 104 may couple through a network 505, such as the Internet, to the evolved Packet Data Gateway (ePDG) 530. The ePDG 530 is utilized in the network function of 4G mobile core networks, known as the evolved packet core (EPC) mentioned above, as well as future mobile networks, such as 5G networks. As noted above, the ePDG 530 may act as an interface between the EPC and non-3GPP networks that may use secure access, such as WiFi and femtocell access networks.

The PGW may function as an inter-RAT mobility anchor. The PGW 520 may couple to an IMS (IP Multimedia Subsystem) server. The IMS server may include a computer system with a processor and memory, which performs various operations as, described herein. The IMS server may implement an IMS Service Layer 540. The IMS server may also implement a Proxy Call Session Control Function (P-CSCF). The P-CSCF may act as the entry point to the IMS domain and may serve as the outbound proxy server for the mobile device. The mobile device may attach to the P-CSCF prior to performing IMS registrations and initiating SIP sessions. The P-CSCF may be in the home domain of the IMS operator, or it may be in the visiting domain where the mobile device is currently roaming.

The IMS server may couple to other networks such as the public switched telephone network (PSTN) or other types of communication networks, e.g., for communicating with other communication devices, such as a standard POTS telephone (shown), another mobile device, etc.

Figure 6:
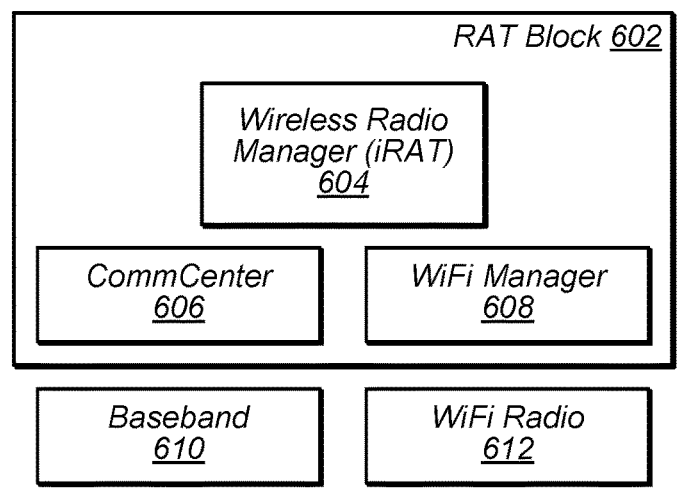
FIG. 6 illustrates various communication components present in some embodiments of the mobile device.

FIG. 6—Mobile Device Functionality

Turning now to FIG. 6, exemplary functionality that may be present in the mobile device 106 is illustrated, according to some embodiments. As shown, the mobile device 106 may include a RAT block 602 that includes a wireless radio manager 604, a communication center (CommCenter) block 606, and a WiFi manager block 608. The wireless radio manager 604 may be configured to receive various statistics from the communication center block 606 and/or the WiFi manager block 608 and determine whether to use one or more of available cellular and WiFi connections based on the statistics. In one embodiment, the communication block 606 may manage or control baseband logic 610 (e.g., related to cellular communication), and WiFi manager block 608 may manage or control WiFi radio 612. Although not shown, the RAT block 602 may include a symptoms manager that may report current connection information (e.g., connection metrics or statistics) to the wireless radio manager 604. Elements of the RAT block 502 may be implemented as software or firmware executable by a processor.

Figure 7:
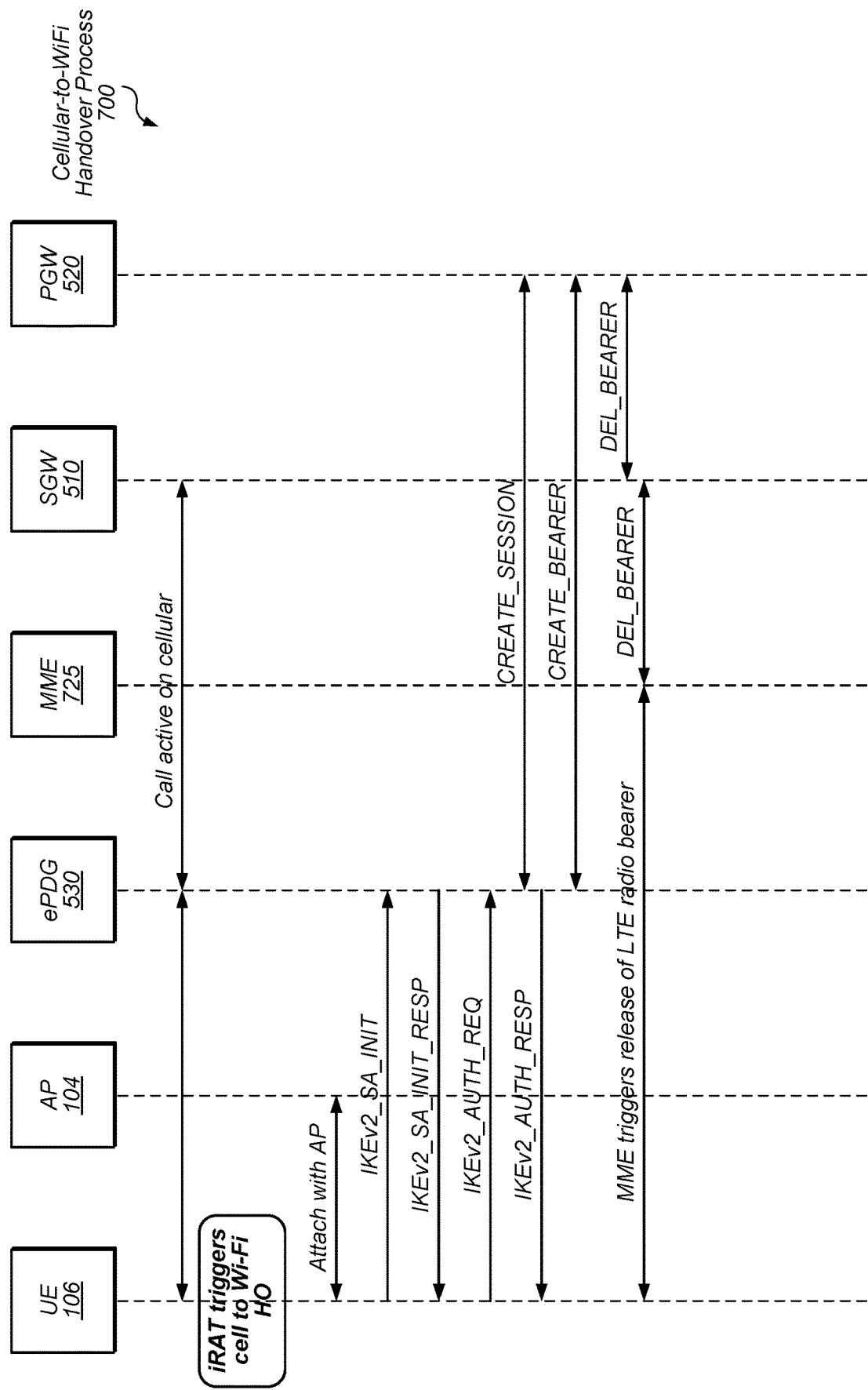
FIG. 7 illustrates some embodiments of a cellular to WiFi handover, which is an example of a UE-initiated handover process.

FIG. 7—Exemplary UE-Initiated Cellular to WiFi Handover

Turning now to FIG. 7, a communication diagram for an exemplary cellular to WiFi handover process 700 is illustrated, according to some embodiments. As shown, this process may be triggered by UE 106 (iRAT manager 604 initiates the handover in the illustrated example). Initially, a call for UE 106 is active on a cellular network, via SGW 510. For example, the call may be a VoLTE call utilizing IMS.

Subsequently, iRAT manager 604 triggers a cellular to WiFi handover. As discussed above, iRAT manager 604 may trigger the handover based on various metrics or criteria. In some embodiments, RAT block 602 is configured to determine and track various metrics for cellular and/or WiFi communications. For example, RAT block 602 may maintain cellular information including: reference signal received power (RSRP), signal to noise ratio (SNR), MAC hybrid automatic repeat request (HARD) packet loss, Packet Data Convergence Protocol (PDCP) discard, and/or radio link control (RLC) packet loss, etc. RAT block 602 may use various sets of these metrics to determine the quality of a cellular connection. Similarly, RAT block 602 may maintain WiFi information including: received signal strength indicator (RSSI), SNR, transmit packet error rate (TX PER), and/or receive (RX) PER, etc. RAT block 602 may use various sets of these metrics to determine the quality of a WiFi connection. Based on this information, iRAT manager 604 may be configured to initiate handovers from cellular to WiFi and vice versa. For example, iRAT manage 604 may initiate a handover to WiFi when it determines that a stable WiFi connection has been established with good signal strength and that the cellular connection quality is low.

In this illustrated example, the UE attaches with AP 104 (this may occur before or after triggering of the handover). Subsequently, in the illustrated embodiment UE 106 sends an Internet Key Exchange (IKE) message IKEv2_SA_INIT to ePDG 530 and receives an IKEv2_SA_INIT RESP response to secure exchange of IKEv2_AUTH message, which is subsequently exchanged. A session and bearer are created between ePDG 530 and PGW 520 for WiFi communication, and the LTE radio bearer is deleted (as triggered by MME 725 in the illustrated embodiment based on signals from PGW 520 and SGW 510).

The handover illustrated in FIG. 7 is shown for exemplary purposes and is not intended to limit the scope of inter-RAT handovers in various embodiments. In various embodiments, a UE may trigger handovers in the other direction (e.g., from WiFi to cellular), between other RATs, etc.

Figure 8:
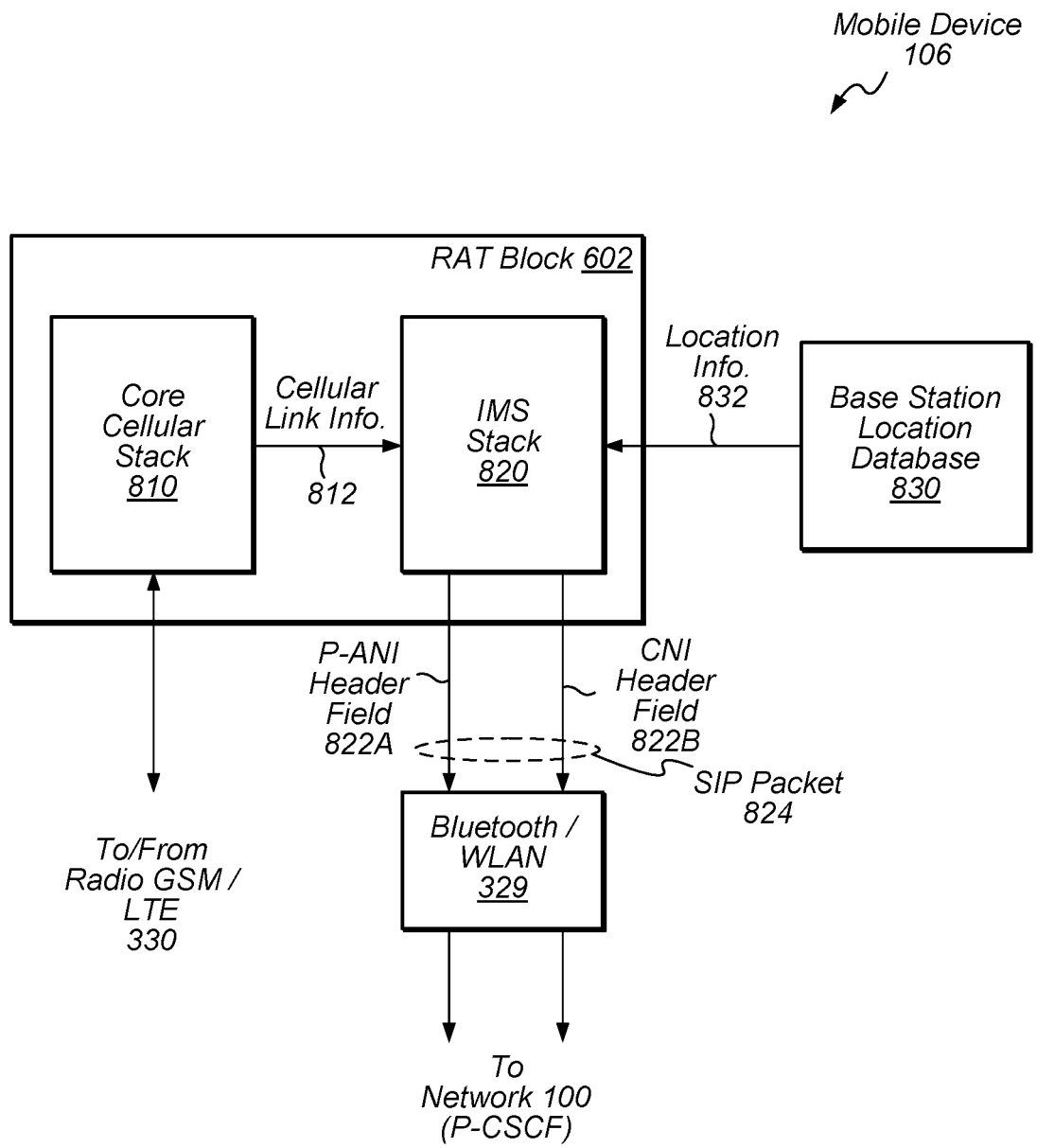
FIG. 8 illustrates some embodiments of a mobile device that communicates cellular-link information over a short-range wireless link.

FIG. 8—Collecting and Communicating Cellular Network Information

A mobile device connecting to a cellular network typically communicates information about the cellular link to the device's network carrier. This information can include a base station identifier, a mobile country code (MCC), a mobile network code (MNC) and/or other information such as the type of protocol being used to communicate over the cellular link, time zone information, etc. This information can be important for various purposes. For example, a network carrier may use the MCC and MNC to determine whether it has any agreements with another network carrier when the mobile device is roaming on that carrier's network. Based on the presence of a particular agreement, the home carrier may select an appropriate billing rate for the mobile device while it is roaming. As another example, the network carrier may use the base station identifier to route an emergency call to the appropriate emergency service provider (e.g., the nearest police dispatch).

Some mobile devices now have the ability to register with a carrier's network over a short-range wireless connection such as a WiFi connection. When a mobile device establishes such a connection, the device may maintain a cellular connection, but no longer sends information about the cellular connection to the carrier—instead, the device may send information about the WiFi connection. The inability to receive information about the cellular connection may prevent the carrier from providing particular services to the mobile device (or at least may prevent the carrier from providing services in an optimal manner).

As will be described below, a mobile device may be configured, in various embodiments, to collect information about a cellular link established by the mobile device and communicate this information to a carrier when the mobile device is communicating with the carrier using a short-range radio access technology (RAT) such as WiFi. In some embodiments, this information may include one or more of an identifier for the base station associated with the cellular link, an MCC, an MNC, an indication of the cellular RAT used to communicate with the base station, and time stamp information. In some embodiments discussed below, this information is included within a packet header field, which may be referred herein as a Cellular-Network-Info (CNI) header field.

Turning now in FIG. 8, a block diagram of components in a mobile device 106 configured to communicate cellular-link information is depicted, according to some embodiments. In FIG. 8, mobile device 106 includes RAT block 602, which manages radio communications for device 106. RAT block 602 may manage cellular connections using a core cellular stack 810 that processes cellular communications. RAT block 602 may also manage connections with an IP multimedia subsystem (IMS) using an IMS stack 820. In various embodiments, layers of stacks 810 and 820 may be implemented using dedicated circuitry and/or software that resides in a memory of device 106 (e.g., memory 306) and executes on one or more processors (e.g., processors 302). In other embodiments, mobile device 106 may be implemented differently than shown in FIG. 8.

Core cellular stack 810 may collect various forms of cellular-link information 812 from radio GSM/LTE circuitry 330. As noted above, in some embodiments, this information 812 includes a base station identifier, an MCC, an MNC, and/or an indication of the type of RAT being used (e.g., "3GPP-UTRAN-TDD," "3GPP2-1X," etc.). In some instances, information 812 may pertain to an active cellular link established with a nearby base station. This active link may currently be in use for facilitating traffic (e.g., a voice communication) or may be idle as the mobile device 106 is merely camping on the base station awaiting potential traffic. In other instance, information 812 may pertain to a previously active cellular link, which has become severed (e.g., the connection was dropped due to a weak signal strength). That is, stack 810 may store information 812 about a cellular link when it is established by mobile device 106. Stack 810 may then continue to store this information 812 after the cellular link is severed, so that it can later be used by IMS stack 820. Information 812 may be collected when the mobile device 106 is connected on a visitor network as well as when device 106 is on its home network. In some instances, information 812 may be collected separately from (e.g., independent of any need by) IMS stack 820. In other instances, stack 810 may collect information upon request from IMS stack 820.

For example, in some embodiments, mobile device 106 may support receiving a request from a user to enter a mode (e.g., an "Airplane Mode") in which cellular communication may be suspended. In response to receiving the request, mobile device 106 may disable radio GSM/LTE 330. If cellular link information 812, however, is need (e.g., stack 820 is performing an IMS registration as discussed below), mobile device 106 may temporarily enable radio 330 in order for stack 810 to collect the information 812. Afterwards, mobile device 106 may disable radio 330 again in accordance of the user's request. In another embodiment, however, stack 810 may merely provide cellular link information 812 that was previously stored prior to entering the requested mode.

IMS stack 820 may aggregate link information and communicate it to network 100, which may correspond to the home network for device 106 (i.e., the network operated by the device's carrier/network provider) or, in some embodiments, may correspond to the network being visited by device 106. In one embodiment, this communicated link information includes information about the link used to access network 100 (e.g., the link used to register device 106 with network 100's IMS). In various embodiments, when the mobile device 106 is connected to network 100 via a short-range wireless link (e.g., WiFi or Bluetooth), IMS stack 820 also communicates cellular link information 812 to network 100. In the illustrated embodiment, stack 820 inserts information about the access link into a packet header field shown as a Private-Access-Network-Info (P-ANI) header field 822A. Accordingly, when mobile device has established a WiFi connection with network 100, P-ANI header field 822A may include information about the WiFi connection. In some embodiments, IMS stack 820 communicates cellular link information 812 within a packet header field labeled as cellular-network-info (CNI) header field 822B when mobile device 106 is communicating with network 100 via Bluetooth/WLAN radio 329.

In various embodiments, CNI header field 822B may include not only cellular-link information 812, but also some additional information, which may be useful to network 100. Accordingly, in some embodiments, stack 820 may include timing information associated with the data in header field 822B. For example, in some embodiments, header field 822B may include a cellular-information-age parameter (referred to as "cell-info-age") that indicates the relative time (e.g., 30 seconds) since cellular-link information 812 was collected by the UE. ("Relative" time stands in contrast to indicating an "absolute" time in which two timestamps are presented—i.e., a timestamp for the current time and the timestamp for when information 812 was collected.) This parameter may be used by network 100 to determine how old the cellular information 812 carried in header field 822B is. In some embodiments, this parameter is a value indicating a number of seconds. In some embodiments, a header field 822B may also include location information for a base station associated with the cellular link. In the illustrated embodiment, IMS stack 820 obtains this information from database 830 (discussed below) as location information 832.

In the illustrated embodiments, header fields 822A and 822B are inserted into Session Initiation Protocol (SIP) packets 824 (i.e., SIP requests) that are communicated to network 100. (In other embodiments, header fields 822A and 822 may be included in other forms of packets, however.) In some embodiments, packets 824 include SIP REGISTER packets that request registration of the mobile device 106 with an IMS of network 100. In such embodiments, these packets 824 may be communicated through an evolved packet data gateway (ePDG) to a proxy-call session control function (P-CSCF) of network 100. There, P-CSCF may then use information extracted from header field 822B to, for example, allow/disallow WiFi calling from specific countries or locations within certain counties due to legal and/or contractual reasons, provide discounted billing from specific countries, etc. In some embodiments, packets 824 include emergency SIP INVITE packets that request establishing a communication between mobile device 106 and an emergency service provider. In such embodiments, these packets 824 may be communicated through an ePDG to an emergency-call session control function (E-CSCF) via a P-CSCF of network 100, where extracted information from header field 822B may be used to route a communication to a call center for the nearest emergency service provider. In some embodiments, stack 820 may also include CNI header fields 822B in other types of SIP packets such as any SIP request for an SIP dialog, any subsequent SIP request (except SIP ACK requests and SIP CANCEL requests) or response (except SIP CANCEL responses) within an SIP dialog or any SIP request. In some embodiments, the UE populates the P-Access-Network-Info header field with the current point of attachment to the IP-CAN as specified for the access network technology. In various embodiments, a CNI header field 822B may be included in any SIP requests and/or responses in which P-Access-Network-Info header fields 822A are present. Examples of possible contents for various embodiments of header fields 822 are described below with respect to FIGS. 9A and 9B. In some embodiments, sensitive information included in header fields 822A and/or 822B may be removed when set outside a trust domain (e.g., as specified in RFC 3325).

Database 830, in some embodiments, is configured to store location information for multiple base stations. This location information may be specified in any of various formats. For example, in one embodiment, database 830 may map a given base station identifier to a corresponding set of location coordinates for the base station (e.g., latitude and longitude coordinates for the base station). In some embodiments, database 830 may be a global database that includes location information for base stations located in different countries throughout the globe. In such an embodiment, database 830 may also include mobile country codes (MCCs) and mobile network codes (MNCs).

In some embodiments, database 830 may support performing a reverse lookup. That is, given a particular location, in some embodiments, database 830 may return information about the nearest base station such as the base station identifier, MCC, and MNC. In some embodiments, this information may be used by a mobile device that does not have cellular capability. For example, a computer may support the ability to communicate with an IMS, but lack a cellular radio. In such embodiments, the computer may query database for information about a nearest base station. The computer may then communicate this information within a CNI header field 822B to network 100 in order for network 100 to, for example, appropriately route an emergency call to a local emergency responder.

Database 830 may be maintained by any of various suitable entities. Accordingly, in some embodiments, database 830 may be maintained by and reside within mobile device 106. In other embodiments, database 830 may be maintained by a cellular carrier. In still other embodiments, database 830 may be maintained by a manufacturer of mobile device 106. Accordingly, although FIG. 8 depicts mobile device 106 as accessing database, in other embodiments, database 830 may be accessible to other entities such as other mobile devices 106, network providers, government entities, etc.

FIGS. 9A and 9B—Exemplary Syntax for P-Access-Network-Info (P-ANI) and Cellular-Network-Info (CNI) Header Fields Turning now to FIG. 9A, an example of an Augmented Baukus-Naur Form (ABNF) syntax (discussed in RFC 5234) for a P-ANI header field 822A is depicted, according to some embodiments. In some embodiments, header field 822A is compliant with the P-ANI header field described in RFC 7315 (entitled "Private Header (P-Header) Extensions to the Session Initiation Protocol (SIP) for the 3GPP"). As shown, header field 822A may include an access-net-spec section, which further includes an access-type section, an access-class section, and an access-info section. The access-type section may identified the RAT being used to establish the link with network 100. The access-class section may identify the class of RAT. The access-info section may include addition information such as local-time-zone information, location information, etc. Accordingly, when mobile device 106 is communicating with network 100 over WiFi, header field 822A include, for example, an access-type set to IEEE-802.11 and access-info set to i-wlan-node-id. It is noted that, although FIG. 9A depicts a particular syntax for header field 822A, header field 822A may be implemented differently in other embodiments.

Turning now to FIG. 9B, an example of an ABNF syntax for the CNI header field 822B is depicted, according to some embodiments. As shown, header field 822B may include a cellular-net-spec section, which includes access-type and cellular-access-info sections. In some embodiments, parameters for these sections may be expressed in a similar manner as parameters used for the P-ANI header field discussed above and discussed in RFC 7315. As shown, header field 822B may also include an extension-access-info parameter, a cgi-3gpp parameter, utran-cell-id-3gpp parameter, ci-3gpp2 parameter, and/or ci-3gpp2-femto parameter. Header field 822B may also include a cell-info-age.

The cgi-3gpp parameter, in some embodiments, is used if the access-type field is set to 3GPP-GERAN. The cgi-3gpp parameter may be set to the cell global identity (CGI), which may be obtained from lower layers of the UE and may be a concatenation of MCC (3 decimal digits), MNC (2 or 3 decimal digits depending on MCC value), location area code (LAC) (4 hexadecimal digits) and cell identity (CI) (as described in 3GPP TS 23.003 entitled "Numbering, addressing and identification"). In such an embodiment, the cgi-3gpp parameter may be encoded in ASCII as defined in RFC 20 (entitled "ASCII format for Network Interchange").

The utran-cell-id-3gpp parameter, in some embodiments, is used if the access-type field is equal to 3GPP-UTRAN-FDD or 3GPP-UTRAN-TDD. The utran-cell-id-3gpp parameter may be set to a concatenation of the MCC (3 decimal digits), MNC (2 or 3 decimal digits depending on MCC value), LAC (4 hexadecimal digits as described in 3GPP TS 23.003) and the UMTS CI (7 hexadecimal digits as described in 3GPP TS 25.331 entitled "Radio Resource Control (RRC); Protocol Specification"), obtained from lower layers of the UE. The utran-cell-id-3gpp parameter may be encoded in ASCII as defined in RFC 20. In some embodiments, the utran-cell-id-3gpp parameter may alternatively be set to a concatenation of the MCC (3 decimal digits), MNC (2 or 3 decimal digits depending on MCC value), tracking area code (TAC) (4 hexadecimal digits as described in 3GPP TS 23.003) and the E-UTRAN Cell Identity (ECI) (7 hexadecimal digits as described in 3GPP TS 23.003). Again, the utran-cell-id-3gpp parameter may be encoded in ASCII as defined in RFC 20. For example, If the MCC is 111, MNC is 22, TAC is 33C4 and ECI is 76B4321, then Cellular-Network-Info header field may be Cellular-Network-Info: 3GPP-E-UTRAN-FDD; utran-cell-id-3gpp=1112233C476B4321.

The ci-3gpp2 parameter, in some embodiments, is used if the access-type field is set to 3GPP2-1X. The ci-3gpp2 parameter may be set to the ASCII representation of the hexadecimal value of the string obtained by the concatenation of system identification number (SID) (16 bits), network identification number (NID) (16 bits), packet zone identification (PZID) (8 bits) and BASE_ID (16 bits as described in 3GPP2 C.S0005-D3) in the specified order. The length of the ci-3gpp2 parameter may be 14 hexadecimal characters in some embodiments. The hexadecimal characters (A through F) may be coded using the uppercase ASCII characters. If the UE does not know the values for any of the above parameters, the UE may use the value of 0 for that parameter. For example, if the SID is unknown, the UE may represent the SID as 0x0000. (Note that, in this example, the SID value is represented using 16 bits as supposed to 15 bits as specified in 3GPP2 C.S0005-D.) As another example, if the SID=0x1234, NID=0x5678, PZID=0x12, BASE_ID=0xFFFF, the ci-3gpp2 value may be set to the string 1234567812FFFF.

In some embodiments, the ci-3gpp2 parameter may also be used if the access type field is set to 3GPP2-1X-HRPD. In such an embodiment, the ci-3gpp2 parameter may be set to the ASCII representation of the hexadecimal value of the string obtained by the concatenation of Sector ID (128 bits) and subnet length (8 bits) (as described in 3GPP2 C.50024-B) and Carrier-ID, if available, (as described in 3GPP2 X.50060) in the specified order. The length of the ci-3gpp2 parameter may be 34 or 40 hexadecimal characters depending on whether the Carrier-ID is included. The hexadecimal characters (A through F) may be coded using the uppercase ASCII characters. For example, if the Sector ID=0x12341234123412341234123412341234, Subnet length=0x11, and the Carrier-ID=0x555444, the ci-3gpp2 value may be set to the string 1234123412341234123412341234123411555444.

In some embodiments, the ci-3gpp2 parameter may also be used if the access-type field is set to 3GPP2-UMB (as described in 3GPP2 C.S0084-000). In such an embodiment, the ci-3gpp2 parameter may be set to the ASCII representation of the hexadecimal value of the Sector ID (128 bits as defined in 3GPP2 C.S0084-000). The length of the ci-3gpp2 parameter may be 32 hexadecimal characters. The hexadecimal characters (A through F) may be coded using the uppercase ASCII characters. For example, if the Sector ID=0x12341234123412341234123412341234, the ci-3gpp2 value may be set to the string 12341234123412341234123412341234.

The ci-3gpp2-femto parameter, in some embodiments, is used if the access-type field is set to 3GPP2-1X-Femto. The ci-3gpp2-femto parameter may be set to the ASCII representation of the hexadecimal value of the string obtained by the concatenation of the femto mobile switching center identification (MSCID) (24 bit), femto CellID (16 bit), FAP equipment identifier (FEID) (64 bit), macro MSCID (24 bits) and macro CellID (16 bits as described in 3GPP2 X.P0059-200) in the specified order. The length of the ci-3gpp2-femto parameter may be 36 hexadecimal characters. The hexadecimal characters (A through F) may be coded using the uppercase ASCII characters.

In some embodiments, the cell-info-age is a value indicating the relative time since cellular-link information 812 (e.g., information about the cell identity) was collected by the UE. In some embodiments, this parameter is expressed as a number of seconds. As one example for an LTE connection, header field 822B may specify Cellular-Network-Info: 3GPP-E-UTRAN-FDD; utran-cell-id-3gpp=3102608b3ba1ff70f; cell-info-age=60. As one example for UMTS connection, header field 822B may specify Cellular-Network-Info: 3GPP-UTRAN-FDD; utran-cell-id-3gpp=310260de7d04e976c; cell-info-age=60. As one for a GSM connection, header field 822B may specify Cellular-Network-Info: 3GPP-GERAN; cgi-3gpp=310260179501e6; cell-info-age=60. That is, the MCC/MNC for T-Mobile USA is 310/260 and the information about the cell identity was collected one minute ago. Although not shown, in some embodiments, header field 822B may include addition (or less) information such as the base station identifier, location information about the base station, etc.

Figure 10A:
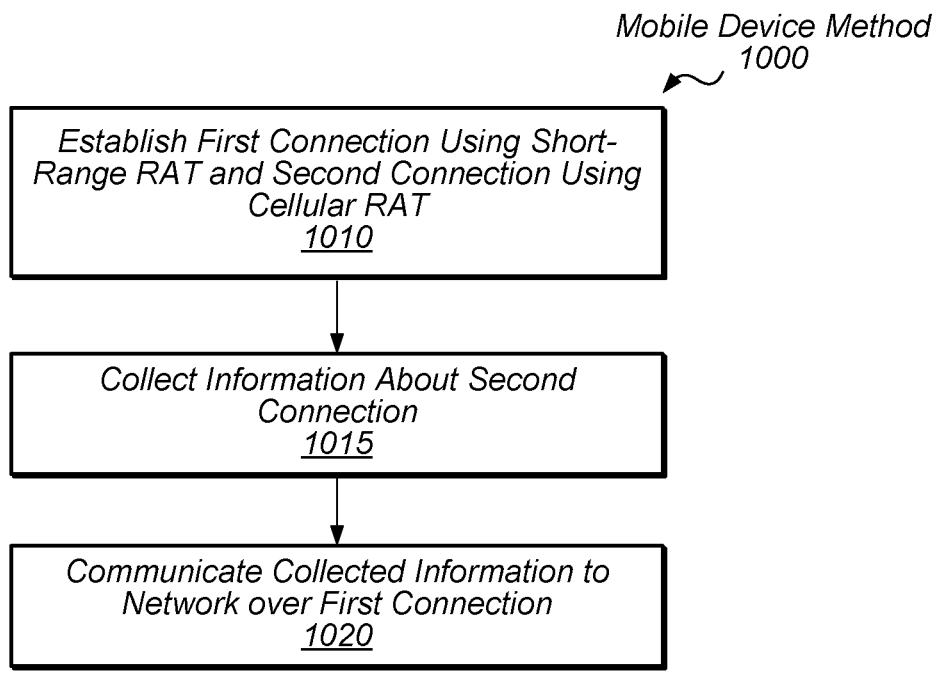
FIGS. 10A-10C illustrate some embodiments of methods associated with communicating cellular-link information.
Figure 10B:
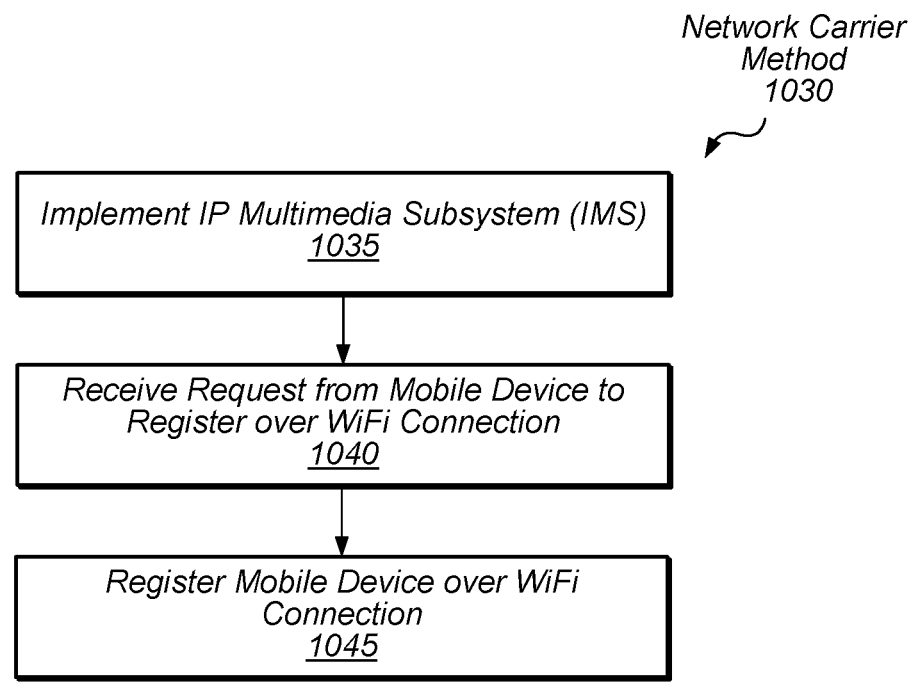
Figure 10C:
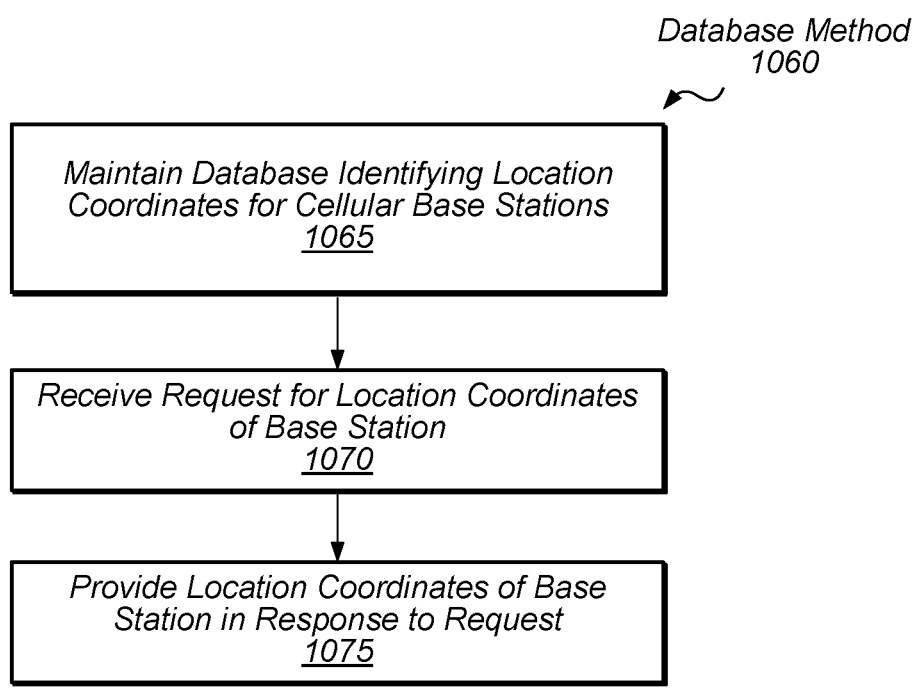

FIGS. 10A-10C—UE and Database Methods

FIGS. 10A-10C depict some embodiments of methods associated with communicating cellular-link information over a short-range wireless link.

Turning now to FIG. 10A, a flow diagram of a mobile device method 1000 is shown. In various embodiments, method 1000 is performed by a mobile device (such as UE 106 via RAT block 602). In some embodiments, performance of method 1000 may allow a network provider/carrier to provide better services to a user of the mobile device.

In 1010, a mobile device establishes a first connection and a second connection with a network such that the first connection uses a short-range RAT and the second connection uses a cellular RAT.

In 1015, the mobile device collects information about the second connection. In some embodiments, the collected information includes one or more of an identifier for a base station associated with in the second connection, a mobile country code (MCC), a mobile network code (MNC), an indication of the cellular RAT and a cellular information age indicating a time since the information about the second connection was collected by the UE. In some embodiments, 1015 also includes collecting information about the first connection. In some embodiments, 1015 may include determining an identifier for a base station associated with the second connection and querying a database (e.g., database 830) for location information associated with the identifier. In some embodiments, 1015 may include receiving a request from a user to enter a mode in which communication using the cellular RAT is suspended, disabling a radio (e.g., radio 330) associated with the cellular RAT in response to the request, determining that collection of the information about the second connection is warranted, and temporarily activating the radio to collect the information about the second connection.

In 1020, the mobile device communicates the collected information to the network over the first connection. In some embodiments, the communicated information is encapsulated within a header field (e.g., CNI field 822B) of a session initiation protocol (SIP) packet. In one embodiment, the SIP packet specifies a REGISTER request to register the mobile device with a IP multimedia subsystem (IMS). In one embodiment, the SIP packet specifies an INVITE request to establish a communication between the mobile device and an emergency service provider. In some embodiments, 1020 includes communicating the SIP packet to a call session control function (CSCF) of the network. In some embodiments, the communicated information includes the location information for the base station. In some embodiments, the information about the first connection is communicated with the information about the second connection (e.g., within the same packet or packets). In one embodiment, the information about the first connection is encapsulated in a P-Access-Network-Info header field in compliance with a session initiation protocol (SIP). In various embodiments, the mobile device communicates the CNI header field in each packet that also includes a P-ANI header field. In some embodiments, the collected information in 1015 is stored and communicated in 1020 to the network over the first connection after the second connection has been severed.

Turning now to FIG. 10B, a flow diagram of network carrier method 1030 is presented. In various embodiments, method 1030 is performed by a carrier that interacts with a mobile device that provides cellular-link information over a short-range wireless link. Method 1030 begins in 1035 with a network carrier implementing an IP multimedia subsystem (IMS). In 1040, the network carrier receives a request from a mobile device to register over a WiFi connection. The request may include information that identifies a cellular base station in communication with the mobile device. In 1045, the network carrier registers the mobile device over the WiFi connection. In some embodiments, method 1030 may also include the network carrier determining a location of the mobile device by querying a database that maintains locations of a plurality of base stations including the identified cellular base station. In some embodiments, method 1030 may include the carrier receiving cellular network information (e.g., a CNI header field) over the short-range network each time it also receives information about the short-range network (e.g., a P-ANI header field).

Turning now to FIG. 10C, a flow diagram of database method 1060 is presented. In various embodiments, method 1060 may be performed by a computer system that supports a database of location information for base stations. Method 1060 beings in 1065 with a computer system maintaining a database (e.g., database 830) that identifies location coordinates for a plurality of cellular base stations. In 1070, the computer system receives a request for location coordinates of a base station, where the request identifies the base station by using a base station identifier. In some embodiments, the request is received from a cellular carrier that received the base station identifier from a mobile device via a WiFi connection. In some embodiments, the request is received from a mobile device configured to communicate the coordinates to a cellular carrier over a WiFi connection. In 1075, the computer system provides the location coordinates of the base station in response to the request.

It is noted that a method is also contemplated for the inverse mapping of location information to an identifier for a base station as discussed above. In some embodiments, this method may include a computer system maintaining a database that associates location information (e.g., latitude and longitude coordinates) with base station information. This method may include the computer system receiving a request for a base station identifier, where the request specifies location information. The method may then include determining a base station nearest to a location corresponding to the specified location information and returning an identifier for the base station (or identifiers of multiple nearby base stations, in some embodiments).

Various embodiments of systems and methods for servicing requests for location information are contemplated based on the preceding description, including, but not limited to, the embodiments listed below.

In one embodiment, a method comprises a computer system maintaining a database that identifies location coordinates for a plurality of cellular base stations and the computer system receiving a request for location coordinates of a base station. The request identifies the base station by using a base station identifier. The method further comprises the computer system providing the location coordinates of the base station in response to the request. In some embodiments, the request is received from a cellular carrier that received the base station identifier from a mobile device via a WiFi connection. In some embodiments, the request is received from a mobile device configured to communicate the coordinates to a cellular carrier over a WiFi connection.

Embodiments of the present disclosure may be realized in any of various forms. For example, various embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A mobile device, comprising:
one or more radios configured to communicate using a plurality of radio access technologies (RATs) including a cellular RAT and a non-cellular RAT;
wherein the mobile device is configured to:
camp on a cell using the cellular RAT, the cell being served by a base station;
collect information about the camped-on cell, wherein the collected information includes an indication of a type of the cellular RAT of the camped-on cell, an identity of the camped-on cell, and timing information associated with the collected information; and
in a header of a session initiation protocol (SIP) message, communicate the collected information to an IP multimedia subsystem (IMS) using the non-cellular RAT via an evolved packet core (EPC).

2. The mobile device of claim 1, wherein the identity of the first camped-on cell includes a mobile country code (MCC) and a mobile network code (MNC).

3. The mobile device of claim 1, wherein the indication of a type of the cellular RAT includes one or more of 3GPP-E-UTRAN-FDD, 3GPP-UTRAN-TDD, 3 GPP-GERAN, and 3 GPP2-1 X.

4. The mobile device of claim 1, wherein the mobile device is further configured to:
prior to communication of the collected information, establish an active connection of the camped-on cell using the cellular RAT to the EPC.

5. The mobile device of claim 4, wherein the SIP message specifies a REGISTER request to register the mobile device with the IMS.

6. The mobile device of claim 4, wherein the SIP message specifies an INVITE request to establish a communication between the mobile device and an emergency service provider.

7. The mobile device of claim 1, wherein the mobile device is configured to:
collect second information about the non-cellular RAT; and
communicate the second information to the IMS using the non-cellular RAT via the EPC.

8. A non-transitory computer readable medium having program instructions stored therein that are executable by a mobile device having one or more radios configured to communicate using a plurality of radio access technologies (RATs) including a cellular RAT and a non-cellular RAT, wherein the program instructions are executable to cause the mobile device to perform operations comprising:
using the cellular RAT to camp on a cell served by a base station;
collecting information about the camped-on cell, wherein the collected information includes an indication of a type of the cellular RAT of the camped-on cell, an identity of the camped-on cell, and age information identifying an age of the collected information; and
in a header of a session initiation protocol (SIP) packet, communicating the collected information to an IP multimedia subsystem (IMS) using the non-cellular RAT via an evolved packet core (EPC).

9. The computer readable medium of claim 8, wherein the collected information includes a mobile country code (MCC) and a mobile network code (MNC).

10. The computer readable medium of claim 8, wherein the SIP packet specifies a REGISTER request to register the mobile device with the IMS.

11. The computer readable medium of claim 8, wherein the operations further comprise:
collect additional information about the non-cellular RAT; and
communicate the additional information to the IMS using the non-cellular RAT via the EPC.

12. The computer readable medium of claim 8, wherein the collected information includes geographical location coordinates associated with the first base station.

13. The computer readable medium of claim 8, wherein the SIP packet specifies an INVITE request to establish a communication between the mobile device and an emergency service provider.

* * * * *